United States Patent [19]

Shinjo

[11] Patent Number: 4,690,599

[45] Date of Patent: Sep. 1, 1987

[54] SELF-PIERCING NUT

[75] Inventor: Katsumi Shinjo, Osaka, Japan

[73] Assignee: Yugen Kaisha Shinjoseisakusho, Osaka, Japan

[21] Appl. No.: 780,095

[22] Filed: Sep. 25, 1985

Related U.S. Application Data

[63] Continuation of Ser. No. 646,468, Sep. 4, 1984, abandoned.

[30] Foreign Application Priority Data

Dec. 24, 1981 [JP] Japan ................ 56-212367

[51] Int. Cl.[4] ............................. F16B 37/04
[52] U.S. Cl. ..................... 411/180; 411/188
[58] Field of Search .......... 411/179, 177, 176, 81, 411/166, 107, 174, 180, 181, 183, 187, 188

[56] References Cited

U.S. PATENT DOCUMENTS

| 2,486,769 | 11/1949 | Watson | 411/180 |
| 3,469,613 | 9/1969 | Steward | 411/179 |
| 3,736,969 | 6/1973 | Warn et al. | 411/179 |
| 3,793,658 | 2/1974 | Ladouceur | 411/179 X |
| 3,810,291 | 5/1974 | Ladouceur | 411/968 X |

FOREIGN PATENT DOCUMENTS 981327 1/1951 France ................ 411/177

Primary Examiner—Gary L. Smith
Assistant Examiner—Adrian H. Whitcomb, Jr.
Attorney, Agent, or Firm—Antonelli, Terry & Wands

[57] ABSTRACT

A self-piercing adapted to be affixed to a metal panel. The nut includes a substantially rectangular body, with a pilot portion provided at the center of an upper surface of the body, which pilot portion is defined by a circumferential side wall which is slightly converged toward an upper surface of the body. The pilot portion includes a punching face disposed around the threaded bolt accommodating hole. Seat faces are provided at each corner of the body, with each seat face being defined toward the pilot portion by a wall spaced from the circumferential side wall of the pilot portion but facing the same. A top level of the seat faces is slightly lower than that of the punching face of the pilot portion. A recess is defined by a space lying between the pilot portion and the seat faces. The recess is opened to continue each side of the rectangular body between adjacent seat faces. The recess is adapted to accept a displaced portion of the metal panel when a punch is applied to the nut so as to strengthen the union between the nut and the panel and prevent relative rotation between the nut and panel.

4 Claims, 12 Drawing Figures

SELF-PIERCING NUT

This is a continuation of application Ser. No. 646,468, filed Sept. 4, 1984, and now abandoned.

The present invention relates to a nut, and, more particularly, to a self-piercing nut or a nut adapted to pierce an anchoring hole in a metal panel whereby the nut is anchored so as to provide a secure joining of the nut and the metal panel.

Conventionally, weldable nuts or clinch nuts have been used to secure elements together with one of the parts being provided with a preformed hole so as to accommodate the weldable or clinch nuts. A disadvantage of such nuts resides in the fact that an additional manufacturing process is required to provide the preformed hole for accommodating the weldable or clinch nuts.

To avoid the above noted disadvantage, self-piercing nuts have been developed and have found wide application in, for example, automobiles, electrical appliances, etc., wherein a variety of parts or components are fastened to a relatively thin sheet metal by bolts or the like.

In, for example, U.S. Pat. No. 3,152,628, a clinch or pierce nut is proposed which includes a pilot portion at a center of a top face thereof, with the pilot portion being constructed so as to function as a piercing punch when applied against a metal panel. A disadvantage of this proposed clinch nut resides in the fact that a previous embossing of the metal panel is required because of a pilot portion of the nut projecting beyond a seat surface thereof. Furthermore, the fastening force obtained depends upon the thickness of the metal panel and it has been found difficult to secure and ensure the existence of a desired strength of the fastening force.

In an attempt to avoid the above noted problems encountered in connection with self-piercing nuts, proposals have been made in, for example, Japanese Patent Publication Nos. 43-14770(14770/68), 48-9531(9531/73) as well as U.S. Pat. Nos. 3,315,345, 3,439,723, and 3,469,613, all of which are related to so-called "high stress" self-piercing nuts. Generally, in the proposed "high stress" self-piercing nuts, a pilot portion is provided at a center top face of the nut with a pair of flange portions being provided to support a metal panel. A significant feature of the "high stress" self-piercing nuts resides in the provision of a pair of dovetail grooves between the pilot portion and the flange portion, with the dovetail grooves being constructed so as to accommodate a displaced portion of the metal panel and to stregthen a union or joining between the nut and the panel.

In practical use, it has been found that a disadvantage of the above noted proposed "high stress" self-piercing nuts resides in the fact that a relatively large space is required in a top face of the nut thereby resulting in providing a nut construction which is relatively large and heavy. Furthermore, a provision of the dovetail grooves in the proposed self-piercing nuts increases the overall production costs for the respective nuts since the grooves are somewhat difficult to form.

A further disadvantage of the above noted "high stress" self-piercing nuts resides in the fact that by virtue of the required relatively long distance between a center axis of the threaded bolt accommodating hole in the metal panel and the flange portions, a danger exists of a buckling when the bolt is fastened into the nut since the forces resulted from the fastening are not transmitted to the flange portions but are extended solely around the fastening axis.

In an attempt to minimize the buckling and avoid other disadvantages of the previously proposed self-piercing nuts, a number of solutions have been offered; however, disadvantages of such solutions reside in the fact that each solution results in the nut having an increased size, increased weight, and/or increased height. For example, even with different manufacturers of the same "self-piercing nut", when the threaded hole has a diameter of one-quarter of an inch, the diagonal distance of the "high stress" self-piercing nut increases by 50% as compared with an ordinary type of self-piercing nut.

The problems of relatively large size and heavy clinch nuts or pierce nuts is particularly disadvantageous when such nuts are used in, for example, the assembly of automobiles since the automobile industry is endeavoring to reduce the total weight of the individual cars. In view of the countless number of clinch nuts used in an automobile, the size and weight of the nuts does not respresent a negligible weight factor.

Generally, a notable feature of the self-piercing nuts resides in the fact that they can be fastened to metal panels under a pressure concurrently provided with a press operation. By virtue of this feature, the nut punching or striking unit can be incorporated into a press mold. Additionally, a plurality of nuts may readily be fastened to a metal panel at one time during a single stroke of a press, which represents the most significant merit of the utilization of self-piercing nuts. However, since press molds have a relatively limited space, in order to incorporate a corresponding number of striking units to the number of nuts in the press mold, it is necessary to reduce the size of the individual nut striking units and, consequently, a reduction in the size and weight of the individual piercing nuts is required.

The aim underlying the present invention essentially resides in providing a self-piercing nut having a reduced size and a reduced weight.

In accordance with advantageous features of the present invention, a self-piercing nut is provided which includes a substantially rectangular or square body, the pilot portion provided at a center of an upper surface of the body, with the pilot portion being defined by circumferential side which is converged toward the upper surface of the body. The pilot portion includes a punching face around a threaded bolt accommodating hole with seat faces being provided at each corner of the body. Each seat face is defined toward the pilot portion by a wall facing but spaced from a circumferential side of the pilot portion. A top level of each seat face is slightly lower than the punching face, and a recess, constituted by a space lying between the pilot portion and the seat faces, is opened to continue each side of the rectangular or square body between the adjacent seat faces. Advantageously, in accordance with further features of the present invention, the self-piercing nut has seat faces at each corner of the substantially rectangular or square body, with the seat faces being adapted to support the metal panel. By virtue of this arrangement of the seat faces, it is possible to shorten a diagonal distance of the self-piercing nut without impairing the fastening ability thereby resulting in the providing of a self-piercing nut having a reduced size and reduced weight.

Furthermore, by virtue of the arrangement of the seat faces in accordance with the present invention, a fastening force is equally applied in all directions with respect to the metal panel. Conversely, when an external force is exerted on the metal panel, the force is equally dispersed with respect to the self-piercing nut thereby avoiding the stress partially concentrating thereon and ensuring a firm and permanent union between the self-piercing nuts and the metal panel.

Accordingly, it is an object of the present invention to provide a self-piercing nut which avoids, by simple means, shortcomings and disadvantages encountered in the prior art.

Another object of the present invention resides in providing a self-piercing nut of a reduced size and weight which is relatively inexpensive to manufacture.

Yet another object of the present invention resides in providing a self-piercing nut which ensures a firm joining between the self-piercing nut and the component to which it is attached.

A further object of the present invention resides in providing a self-piercing nut having a high fastening force.

Yet another object of the present invention resides in providing a self-piercing nut adapted to be automatically conveyed to an assemblying apparatus without paying any special attention to the orientation of the nuts on the conveyor, i.e., the part of a preceeding nut and following nut, so as to facilitate an automatic conveying of the self-piercing nuts to the assemblying apparatus.

These and other objects, features, and advantages of the present invention will become more apparent from the following description when taken in connection with the accompanying drawing which shows, for the purposes of illustration only, one embodiment in accordance with the present invention, and wherein.

Figure 10:
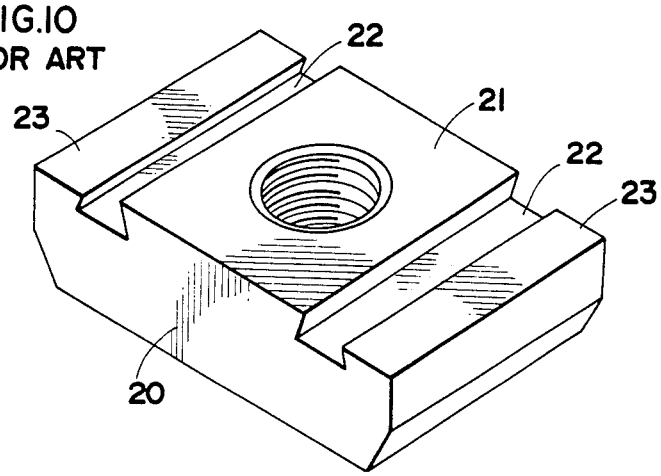
FIG. 10 is a perspective view of a prior art "high stress" self-piercing nut.
Figure 11:
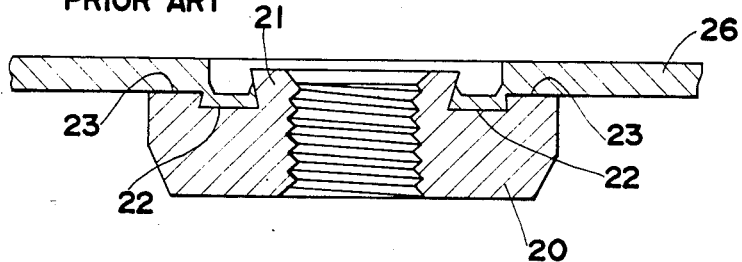
FIG. 11 is a cross sectional view of an assembly of the self-piercing nut of FIG. 10 and a metal panel.
Figure 12:
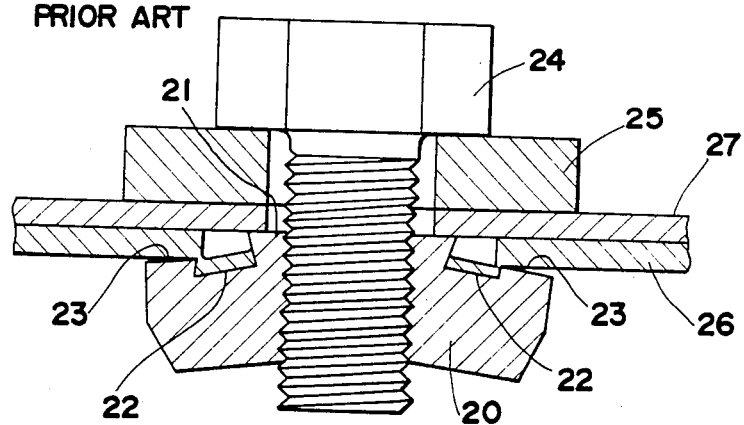
FIG. 12 is a cross sectional view of an assembly of the self-piercing nut of FIG. 10 to two metal panels by way of a bolt and a washer.

Referring now to the drawings wherein like references numerals are used throughout the various views to designate like parts and, more particularly, to FIGS. 10–12 which represent a typical example of a "high stress" self-piercing nut, according to these figures, a nut 20 is provided which includes a pilot portion 21, disposed around a central bolt accommodating hole, and a pair of flange portions 23 disposed on respective sides of the pilot portion 21. Additionally, a pair of dovetail grooves 22 are disposed between the pilot portion 21 and the respective flange portions 23. The dovetail grooves are constructed so as to accommodate a swagged or displaced portion of a metal panel 26 thereby strengthening the union of the nut 20 on the metal 26.

A disadvantage of the self-piercing nut of FIGS. 10–12 resides in the fact that, by virtue of the provision of the pilot portion 21 at the upper surface of the nut 20, the nut 20, as a whole, becomes relatively large and heavy and, consequently, the nuts per unit area to be applied in, for example, an assemblying operation, is considerably limited in number. Furthermore, the dovetail grooves 22 are somewhat difficult to shape so that the average cost of producing the nuts 20 is relatively high.

Additionally, as shown most clearly in FIG. 12, a distance between the central axis of the bolt accommodating hole and the flange portion 23 poses the danger of a buckling of the nut 20, when such nut is fastened by a bolt 24 in order to enable a fastening of a further member 27 to the metal panel 26. Consequently, this prevents a fastening force provided from the bolt 24 from being transmitted by the flange portions 23.

In order to solve the problem of the deformation due to a buckling, it has been proposed that the amount of metal in an area of the dovetail grooves 22 be increased; however, as readily apparent, by increasing the amount of metal the size, height, and weight of the nut are disadvantageously increased. Additionally, in order to enable a fastening force provided by the bolt 24 to be spread or divided equally to the flange portions 23, the head of the bolt 24 might be enlarged so as to extend over the flange portions 23; however, such proposal would then require the manufacturing of a special bolt having the enlarged head portion.

FIG. 12 also illustrates another solution to the problem of buckling, namely, the utilization of a thick large washer 25 between the head of the bolt 24 and member 27 to be fastened to the metal panel thereby avoiding the need for increasing the size of the head of the bolt 24. This proposal however, is disadvantageous inasmuch as the nut has an increased size, increased weight, and/or an increased height. The increased size, increased weight and increased height of the self-piercing nuts are, as noted above, extremely disadvantageous particularly for use in the manufacturing of automobiles because, by virtue of the number of the nuts and bolts in an automobile, there results an increase in the overall weight of the automobile. In this respect, the automobile manufacturers require light, small, and more efficient self-piercing nuts while nevertheless requiring a stable firm union between the joined members.

FIGS. 1–9 provide an example of a self-piercing nut in accordance with the present invention and, according to these figures, a self-piercing nut generally designated by the reference numeral 1 has a substantially rectangular configuration and, in the illustrated embodiment, the nut is provided with a square body having chamfered corners 11. The nut 1 includes a pilot portion generally designated by the reference numeral 3 disposed around a threaded hole 2 for accommodating a fastening bolt (not shown), with the pilot portion 3 being disposed in a center of a top face of the nut 1. The pilot portion 3 includes a circumferential side wall portion 4 and a punching face 5 disposed around the threaded hole 2, with the circumferential side wall or portion 4 being converged toward a top face of the nut 1. The punching face 5 is constructed so as to work as a punch against a metal panel to pierce a hole therein.

Figure 1:
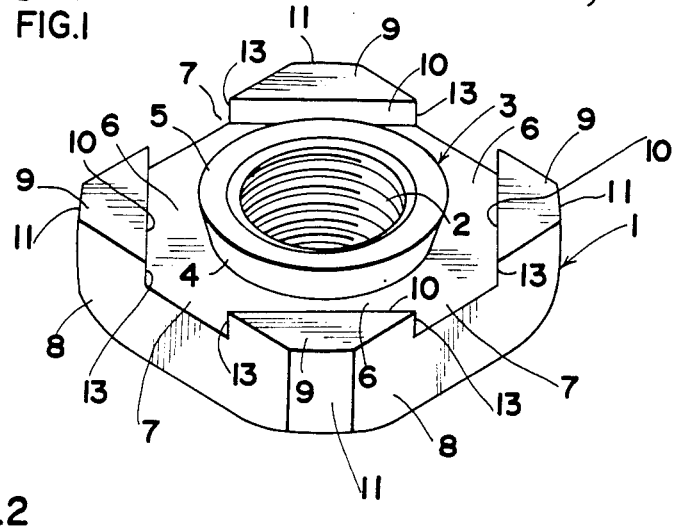
FIG. 1 is a perspective view of a self-piercing nut constructed in accordance with the present invention.
Figure 2:
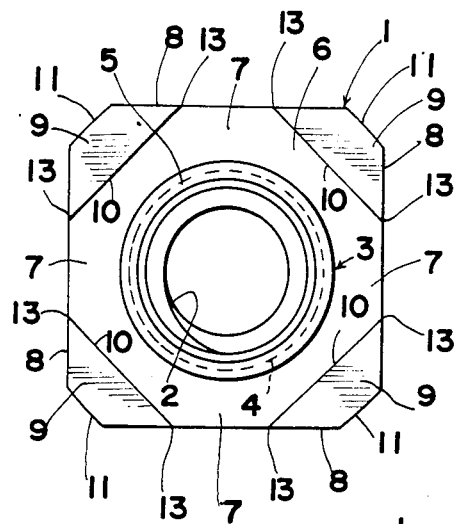
FIG. 2 is a plan view of the self-piercing nut of FIG. 1.
Figure 3:
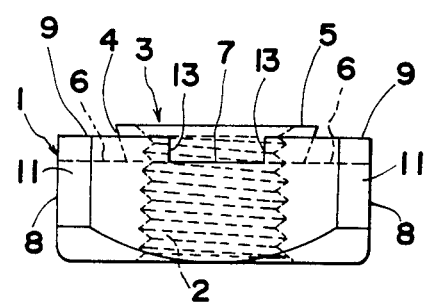
FIG. 3 is a side view of the self-piercing nut of FIG. 1.
Figure 4:
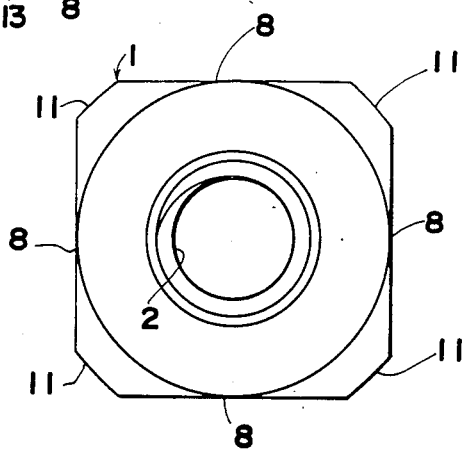
FIG. 4 is a bottom view of the self-piercing nut of FIG. 1.
Figure 5:
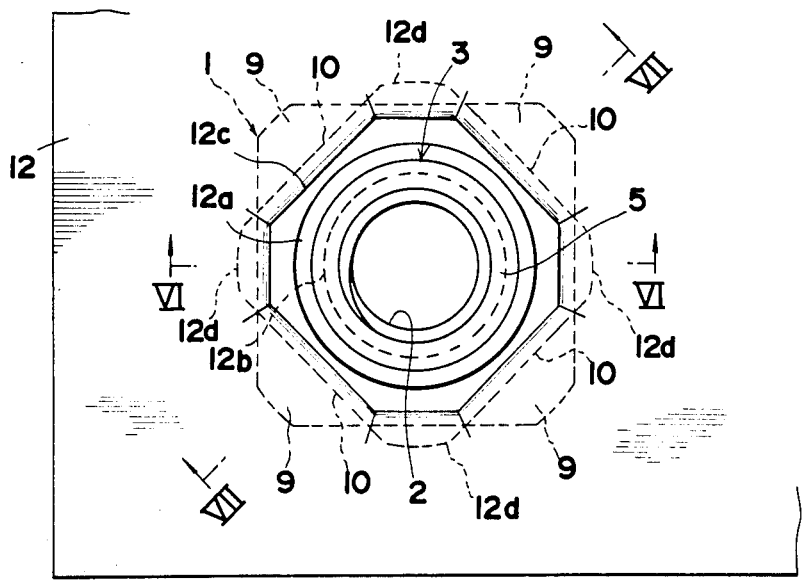
FIG. 5 is a plan view of the self-piercing nut of FIG. 1 affixed to a sheet metal panel.
Figure 6:
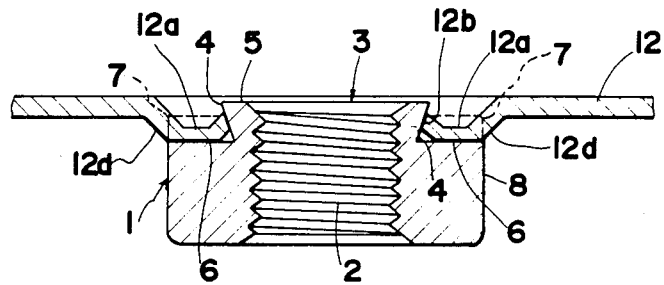
FIG. 6 is a cross sectional view taken along the line VI—VI in FIG. 5.
Figure 7:
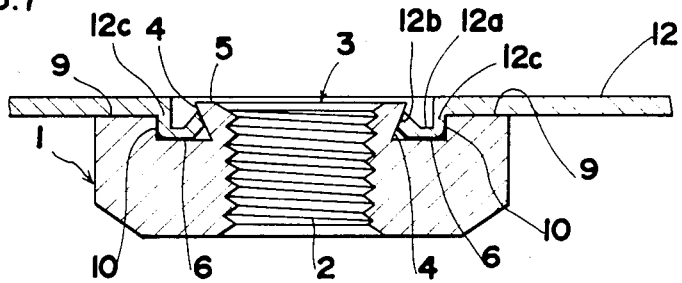
FIG. 7 is a cross sectional view taken along the line VII—VII in FIG. 5.
Figure 8:
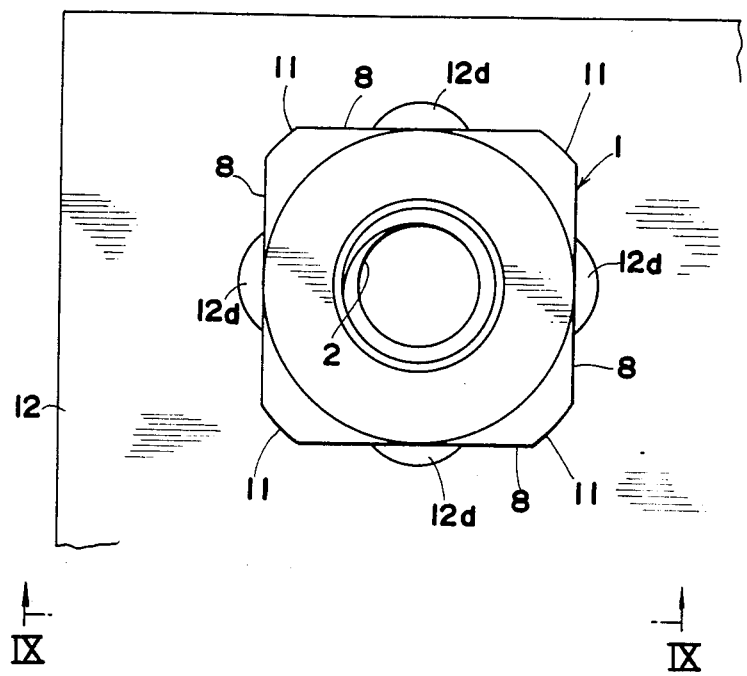
FIG. 8 is a bottom view of the assembly of the self-piercing nut of the present invention and the metal panel.
Figure 9:
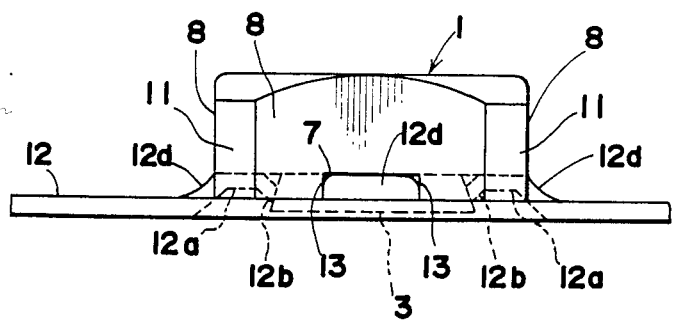
FIG. 9 is a side view of the assembly of FIG. 8 taken in the direction of the arrows IX—IX.

A seat face 9 is provided at each corner of the nut 1, with the seat face 9 being adapted to support the metal panel 12 in a manner shown most clearly in FIG. 7. The seat face 9 includes a wall 10 facing the circumferential side wall or portion 4 but spaced therefrom, with the wall 10 being adapted to prevent the self-piercing nut from rotating after the self-piercing nut is fastened to the metal panel. The remaining portion of the upper surface of the nut, excluding the seat faces 9 and pilot portion 3 form a recess 6 which is adapted to accommodate a swagged or displaced portion of the metal panel 12. The recess 6 is provided with openings 7 between the adjacent seat faces so as to continue to the sides 8. Each wall 10 of the seat faces 9 is perpendicular to a diagonal axis of the nut 1 and has a pair of shoulders 13 at an intersection of the sides 8 of the nut 1. The punching face 5 of the pilot portion 3 slightly projects beyond the seat faces 9 as shown most clearly in FIG. 3.

In order to affix the nut 1 to the metal panel 12, as shown most clearly in FIGS. 6–9, the metal panel 12 is placed between the punching face 5 of the nut 1 and a swagging die (not shown), and then the swagging die is moved downwardly to come into engagement with the metal panel 12, during which operation a hole is pierced by the punching face 5 of the nut 1. A portion 12a of the metal panel 12 around the pierced hole is swagged or displaced into the recess 6, and the metal panel 12 is supported on the seat faces 9. A portion 12a of the metal panel 12 spreads into a depth of an intersection of the circumferential side wall or portion 4 and an upper surface of the nut 1, thereby enabling an edge portion 12b of the diaplaced metal to rest alongside of the circumferential side wall portion 4 as shown most clearly in FIG. 7, thereby ensuring a strong union or joining of the nut 1 and the metal panel 12.

A bent portion 12c of the displaced metal of the metal panel 12 is placed in contact with the walls 10 of the seat face 9 thereby preventing the self-piercing nut 1 from rotating with respect to the metal panel 12 or vice versa. Additionally, a further portion 12d of the displaced metal is extruded through the recess 6 as shown most clearly in FIGS. 8 and 9.

Advantageously, the extruded portions 12d are held by means of shoulders 13 of the seat faces 9 thereby strengthening the effect of preventing a relative rotation of the self-piercing nut 1 or the metal panel 12 relative to each other and, in this manner, the self-piercing nut 1 is firmly fastened to the metal panel 12 without the possibility of relative rotation of the nut 1 or metal panel 12.

While I have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

I claim:

1. A self-piercing nut adapted to be fixed to a metal panel, the self-piercing nut comprising a substantially rectangular body portion, a centrally disposed threaded fastener accommodating hole extending through said body portion, a pilot means provided around said threaded fastener accommodating hole for punching a nut accommodating hole in the metal panel, said pilot means includes a circumferential side wall converging toward an upper surface of said body portion, and a punching face defining a periphery of the threaded fastener accommodating hole, an individual seat face means provided only at each corner of said body portion for supporting the metal panel, said seat face means including an upper surface having a substantially flat profile and a substantially vertically extending wall portion facing the circumferential wall portion of the pilot means and spaced therefrom, said wall portion of said seat face means extending perpendicular to a diagonal axis of the body portion, each of said wall portions of said seat face means intersects with sides of the body portions such that the said seat face means are provided with shoulder portions at respective intersections, and single recess means defined between adjacent seat face means for receiving extruded portions of the metal panel between the shoulder portions thereby preventing relative rotation between the self-piercing nut and the metal panel and ensuring a firm fastening of the self-piercing nut to the metal panel.

2. A self-piercing nut according to claim 1, wherein a top surface of each seat face means is disposed slightly lower than an upper surface of said punching face.

3. A self-piercing nut according to claim 2, wherein said recess means is further defined by a space disposed between said circumferential side wall of said pilot means and said wall portion of said seat face means, said recess means being open to each side of the body portion to continue each side thereof between adjacent seat face means.

4. A self-piercing nut according to claim 1, wherein said recess means is clearly defined by a space disposed between the circumferential side wall of said pilot means and said substantially vertically extending wall portion of said seat face means, said recess means being open to each side of the body portion to continue each side thereof between adjacent seat face means.

* * * * *